May 6, 1947.  E. H. LAND  2,420,252
OPTICAL INTERFERENCE SIGHT FOR GUNS, CAMERAS OR THE LIKE
Filed March 23, 1945
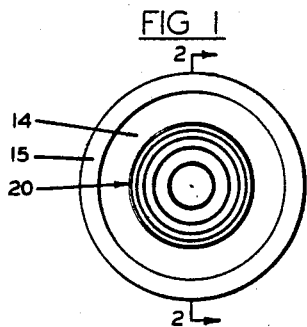
FIG. 1
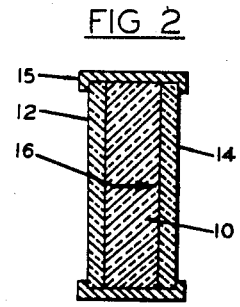
FIG. 2
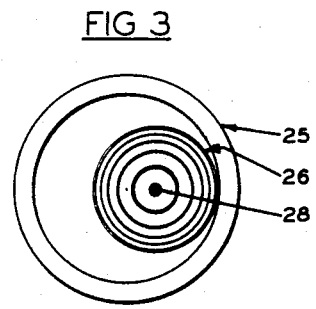
FIG. 3
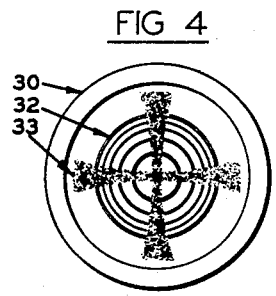
FIG. 4
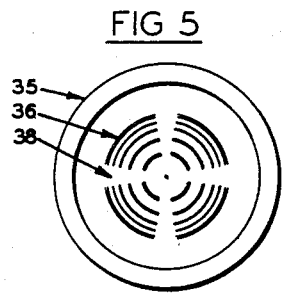
FIG. 5
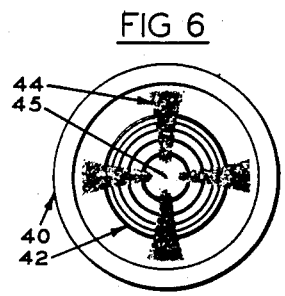
FIG. 6
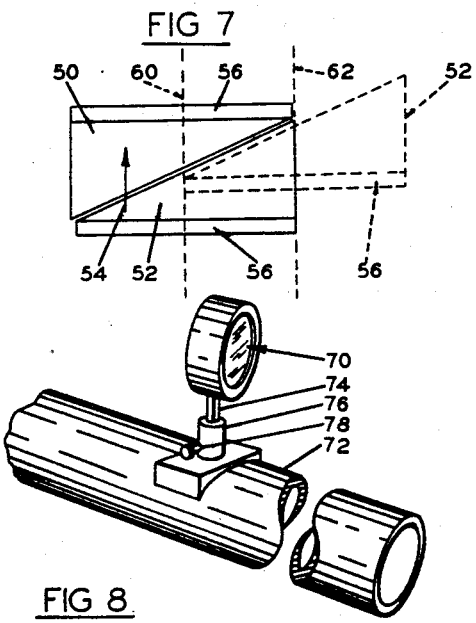
FIG. 7
FIG. 8
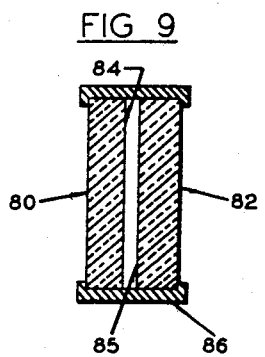
FIG. 9
INVENTOR
Edwin H. Land
BY
Donald L. Brown
ATTORNEY Patented May 6, 1947

2,420,252

UNITED STATES PATENT OFFICE 2,420,252

OPTICAL INTERFERENCE SIGHT FOR GUNS, CAMERAS, OR THE LIKE

Edwin H. Land, Cambridge, Mass., assignor to Polaroid Corporation, Cambridge, Mass., a corporation of Delaware Application March 23, 1945, Serial No. 584,295

30 Claims. (Cl. 88—65)

This invention relates to sighting devices, and more particularly to a new and improved sight for use with firearms, cameras and similar instruments adapted to be aimed in a predetermined direction. This application is a continuation-in-part of my applications, Serial No. 456,181, filed August 26, 1942, and Serial No. 547,023, filed July 28, 1944.

It is one object of the present invention to provide a sighting device of the above type comprising optical means for producing an interference pattern at optical infinity visible to an observer looking through said device and particularly such a sighting device wherein said pattern serves as the only reticle and defines a predetermined series of angular directions with respect to said device.

Another object is to provide a sighting device wherein the observer sees indicia impressed on his field of view at optical infinity and wherein said indicia consists of an interference pattern whose formation and apparent relation to objects in said field is a function of the angle of incidence on said device of light rays from said field.

Further objects of the invention are to provide a sight having the above characteristics wherein said interference pattern is produced by selective transmission of light incident on said sight from the field of view as a function of the angle of incidence of said light on said sight, to provide such a sight wherein said pattern is produced by selective absorption of incident light from said field as a function of the angle of incidence thereof, and to provide such a sight wherein said selective transmission or absorption for light of any given angle of incidence is constant over substantially the entire area of said sight.

A still further object is to provide a sight as outlined above characterized by the fact that it may comprise an extremely large viewing area and further characterized by the fact that the interference pattern serving as the reticle of the sight appears to remain fixed in spatial relation to objects in the field of view irrespective of sidewise motion of the eye of the observer with respect to said sight.

A still further object of the invention is to provide a sighting device of the above type wherein said interference pattern comprises a series of concentric rings or symmetrically arranged segments of rings, and particularly wherein there is a predetermined dimensional relation between each of said rings or segments and each other ring or segment in said pattern and wherein said relation is a function of the angle of incidence on said sight of light from the field of view.

Still further objects are to provide a sighting device of the above characteristics wherein said pattern-forming means are positioned in the line of sight through said device, to provide such a sight wherein said pattern-forming means comprise a pair of superimposed light polarizing elements having positioned therebetween a birefringent element of such thickness and birefringence as to produce an interference pattern of the character described, to provide such a sight wherein said polarizing elements are either like or unlike circularly polarizing elements or are linear polarizing elements having their polarizing axes at an angle to each other of any value from 0° to 90° inclusive, and to provide such a sight wherein said birefringent element is a basal section of a uniaxial crystal such as calcite or sodium nitrate.

Still further objects are to provide in combination with a sight of the above characteristics means for mounting said sight in operative relation with a gun, camera or similar instrument in such manner that the interference pattern in said sight bears a predetermined relation to the direction of aim of said instrument, and particularly such that the angular directions defined by said pattern bear a predetermined relation to said direction of aim, to provide such mounting means in combination with a sight as outlined above comprising uniaxial birefringent material such that the optic axis of said material coincides with or bears some other predetermined relation to said direction of aim, and to provide such mounting means comprising also means for varying the relation between said optic axis or interference pattern and said direction of aim.

Still further objects and advantages will in part appear and in part be pointed out in the course of the following detailed description of several embodiments of the invention, which are given as nonlimiting examples, in connection with the accompanying drawings, in which:

Figure 1 is an elevation showing a sight comprising an embodiment of the invention and illustrating diagrammatically the pattern visible when the pattern-forming means comprise a basal section of a uniaxial crystal positioned between circularly polarizing elements adapted to transmit light circularly polarized by each other;

Figure 2 is a section on the line 2—2 in Fig. 1;

Figure 3 is a view similar to Fig. 1 but illustrating the pattern visible when circular polarizers are employed of a character adapted to block light circularly polarized by each other;

Figures 4, 5 and 6 are views similar to Fig. 1 but illustrating different patterns obtainable when linear polarizers are employed, Fig. 4 representing the case of linear polarizers with their axes substantially perpendicular, Fig. 5 showing the case of linear polarizers having their axes substantially parallel, and Fig. 6 showing the case of linear polarizers having their axes neither parallel nor perpendicular;

Figure 7 is a diagrammatic fragmentary view in plan of a modification of the invention illustrating a method for altering the effective thickness of the birefringent material embodied therein;

Figure 8 is a diagrammatic representation of the sight of the invention and means for mounting the same in connection with firearms, such for example as a machine gun; and Figure 9 is a diagrammatic sectional view illustrating a form of the invention embodying a different type of pattern-forming means.

The great majority of sights heretofore provided for use particularly in connection with rifles and other firearms have possessed one distinct disadvantage. They have depended for their accuracy upon a relatively fixed position of the head, and more specifically the eye, of the observer with respect to the sight. In many cases, notably in connection with machine guns and similar weapons used in airplanes and in connection with cannon employed on merchant vessels and the like, the movement of the support for the firearm has made it exceedingly difficult for the gunner to obtain an accurate sight, and where a gunner is subjected to long periods of activity in connection with sights of the standard type, severe eyestrain has developed.

It is a principal object of the present invention to provide a sight in which the rigidity of the standard sight is dispensed with and in which slight movements of the eye of an observer with respect to the firearm or other device with which the sight is associated do not impair the operation of the sight itself. To this end the sight of the present invention provides optical indicia, and preferably symmetrical optical indicia such for example as a set of concentric rings, superimposed upon the field of view of said sight at optical infinity and which serve as the reticle of said sight and bear a predetermined relation to the direction of aim of said firearm. Thus, for example, the center of said rings may appear to coincide in space with that object in the field at which the firearm is aimed. The sight of the present invention is so constructed that as the eye of an observer moves vertically or laterally with respect to the surface of the sight, which is of appreciable area, the concentric rings or other indicia appearing in the sight apparently move with the eye of the observer, so that as the observer shifts position with respect to the sight the essential sighting means moves with him. Under these circumstances great strain is removed from the gunner or observer. He may take a position of considerable comfort; he is not restricted to a fixed and rigid position. If he moves, or if his gun mount moves while he is sighting his firearm, his sight apparently moves at the same time. The advantages of such a device will be apparent to anyone who has attempted to use standard rigid sights of the type now generally employed.

In the embodiment of the invention shown in Figs. 1 and 2, element 10 comprises birefringent material mounted between a pair of light polarizing elements 12 and 14. It will of course be understood that all of the elements 10, 12 and 14 may preferably be bonded together by any suitable adhesive means and may be provided with additional protective lamina of glass or the like, but for the sake of simplicity specific illustration of such means is omitted from the drawings, and said elements are merely shown as mounted within any suitable rim 15 or the like. Polarizers 12 and 14 may comprise any suitable polarizing material such for example as any of the sheet polarizing materials sold under the tradename "Polaroid."

In one form of the invention element 10 comprises uniaxial birefringent material, and preferably a basal section of uniaxial material as is indicated by arrow 16, which represents the optic axis of element 10. Examples of materials suitable for use in element 10 include calcite, sodium nitrate, or any other crystal or similar material having the optical properties of a basal section of a uniaxial crystal and which is, therefore, optically isotropic for light normally incident thereon but birefringent for obliquely incident light. It is to be expressly understood however, that the invention is not limited to such disposition of the optic axis of element 10. The only essential condition is that it be possible for light incident on element 10 from one of polarizers 12 and 14 to traverse said element along the optic axis thereof and to enter the other of said polarizers without being totally internally reflected. It will be seen, therefore, that although in the preferred case axis 16 will be normal to the surfaces of element 10 adjacent the polarizers, it may be inclined thereto provided the above condition obtains and provided also that such inclination is compensated for by the mounting means for said sight, as will be described hereinafter. Reference should also be had to my said copending application Serial No. 547,023, which describes the use of biaxial birefringent materials in sights of the type of the present invention.

When in accordance with the invention the above device is mounted as a sight, an observer looking therethrough along the optic axis of element 10 will see an interference pattern at optical infinity which serves as the reticle of the sight and defines a predetermined series of angular directions with respect thereto, as will be described. The precise configuration of said pattern depends upon the nature of polarizers 12 and 14 and the mutual relation of their polarizing axes. Fig. 1 illustrates the pattern formed when polarizers 12 and 14 are circularly polarizing elements of the type adapted to transmit light circularly polarized by each other. It will of course be understood that in this case each of said polarizers may comprise a linear polarizing element and a quarter-wave retardation element positioned between its associated polarizing element and element 10 with its vibration directions at angles of substantially 45° to the axis of said polarizing element.

As shown in Fig. 1, the pattern formed in this embodiment of the invention comprises a series of concentric rings 20, colored in white light and black in monochromatic light. Furthermore, said rings are at optical infinity and are a function of the angle of incidence on the sight from the field. This may be readily understood by considering the optical properties of element 10. Since it is isotropic for normally incident light and since polarizers 12 and 14 have been described as adapted to transmit light circularly polarized by each other, light normally incident on the device from the field will be freely transmitted, giving rise to the open center of the innermost of rings 20. For obliquely incident light however, element 10 will be birefringent and will produce relative retardation, and for angles of incidence at which the retardation approaches one half-wavelength, the polarization characteristics of the light polarized by the first of the circular polarizers will be effectively reversed so that it is blocked by the second polarizer, thus producing the first of the dark interference rings 20. The second ring is defined by light incident on the sight at such an angle that the relative retardation therefor in element 10 approaches three half-wavelengths, and so forth. It will thus be seen that when the device shown in Figs. 1 and 2 is mounted as a sight, the center of rings 20 will directly overlie that point in the field from which light is passing to the eye of the observer along the optic axis of element 10. If therefore, for example, said sight is mounted on a rifle or similar fire arm with the optic axis of element 10 parallel to the barrel of said gun, the center of rings 20 will directly coincide in the field with the object at which said gun is aimed, subject only to the slight parallax resulting from the sight being offset with respect to said barrel and the motion of said pattern with the wearer's head as explained hereinafter.

The above-described embodiment of the invention possesses a variety of novel and unique advantages. One which is readily apparent is the fact that since the interference pattern which serves as the reticle of the sight is at optical infinity, it will be substantially in focus with any object in the field at which it may be directed. This avoids the disadvantage inherent in conventional gun sights wherein the reticle is physically positioned closely adjacent the observer's eye and therefore wholly out of focus with the field. Another advantage is that since the reticle itself is at infinity and not in the plane of the means whereby it is formed, any imperfections, dirt or the like physically present on the sight will be out of focus when it is in use.

Another advantage of the sight of the present invention has already been referred to and is that motion of the observer's eye with respect to the sight will not affect the spatial relation between the reticle and the field. This advantage is illustrated particularly in Fig. 3, which represents the interference pattern obtained in a sight 25 similar to that shown in Figs. 1 and 2 but employing unlike circular polarizers, i. e., polarizers adapted to block light circularly polarized by each other. As shown in Fig. 3, said pattern comprises a series of concentric rings 26 similar to rings 20 in Fig. 1 but having a dark center dot 28 as opposed to the open center of the pattern shown in Fig. 1. The formation of said dot is substantially the converse of the formation of the open center of rings 20. That is to say, light normally incident on the device and circularly polarized by the first of the polarizers will traverse the birefringent element without relative retardation and will accordingly be blocked by the second of the circular polarizers. On the other hand, obliquely incident light will undergo relative retardation and will therefore have its polarization characteristics so altered that it will be transmitted to varying extents by the second of the polarizers. Thus the innermost of rings 26 will be formed by light incident on the device at such angles that its relative retardation within the birefringent element will approach one wavelength, and so forth.

As noted, Fig. 3 illustrates the extremely important advantage of the sights of the present invention that the user thereof is not limited to a single eye position as in the case of conventional sights. A line from the eye of an observer to the center of dot 28 will always make the same angle with the face of sight 25, and the same is true of a line from an observer's eye to the center of rings 20 in Fig. 1. It follows, therefore, that if the observer's eye moves laterally, dot 28 and rings 26 will similarly appear to move with respect to the surface of sight 25, as is indicated in Fig. 3 by showing the ring pattern offset with respect to the center of the device. However, since said pattern is at optically infinity, the motion of dot 28 with respect to the field will be negligible and cannot exceed its apparent motion with respect to the face of the sight. In other words, if the diameter of the sight is, for example, two inches, the apparent motion of dot 28 with respect to the sight and field resulting from motion of the observer's eye will be approximately two inches, an amount obviously too small to require any consideration in aiming. To state the matter from another aspect, a line from the observer's eye to that point in the field directly coinciding with the center of dot 28, or with the center of circles 20 in Fig. 1, will always traverse the birefringent material in the sight along the optic axis thereof and will always make the same angle with the surface of said sight. Furthermore, since as pointed out above the optic axis of said birefringent material will preferably be substantially perpendicular to its surfaces, said line will in the preferred embodiment of the invention coincide with a normal from the observer's eye to the surface of the sight.

A still further advantage of the sights of the present invention derives from the fact that the interference patterns used as the reticles of said sights each define a predetermined series of angular directions with respect to the sight. The center of the pattern and any point in the field with which it coincides lie on a normal to the sight from the field which will reach the eye of the observer. The innermost ring essentially defines an optical cone comprising rays whose angle of incidence on the sight is such that they undergo relative retardation within the birefringent element of one half-wavelength for like polarizers and one wavelength for unlike polarizers. It follows that any point coinciding in the field with the innermost ring is at an angular distance from the point at the center of the pattern equal to said angle of incidence at which maximum interference results, and this angle may readily be predetermined as follows.

The relative retardation within birefringent element 10 depends upon both the birefringence and the thickness of said element. This may be expressed by the equation $$t = \frac{2\Gamma}{\sin^2 i} \cdot \frac{we^2}{w^2 - e^2}$$

wherein $t$ is the thickness of element 10, $w$ and $e$ are respectively the ordinary and extraordinary refractive indices of the material in element 10, $i$ is the angle of incidence for a particular ring and $\Gamma$ is a variable depending upon whether like or unlike polarizers are used and upon the particular ring. Thus for example, in white light and for like polarizers $\Gamma$ will be equal to one half-wavelength of visible light for the first innermost ring, three half-wavelengths for the second ring and five half-wavelengths for the third ring, etc., and for unlike polarizers Γ will be equal to one wavelength for the first ring, two wavelengths for the second ring, three wavelengths for the third ring etc., in every case expressed in the same units as $t$.

It will thus be seen that by appropriate choice of the thickness and birefringence of element 10 it is possible to control the innermost ring to any desired angular size. Furthermore, the other rings in each pattern bear a fixed relation to the innermost ring. Their radii in the case of like polarizers follow the progression $\sqrt{1}$, $\sqrt{3}$, $\sqrt{5}$, $\sqrt{7} \ldots \sqrt{2n-1}$, wherein $n$ refers to the number of any ring starting with the innermost number of the series, and in the case of unlike polarizers follow the progression $\sqrt{1}$, $\sqrt{2}$, $\sqrt{3}$, $\sqrt{4} \ldots \sqrt{n}$. In other words an observer using the novel sight of the invention can compute the angular distance between objects in the field by their relation to different rings in the reticle pattern. For example, if in the embodiment of the invention shown in Figs. 1 and 2 the angle of incidence on the device of the light rays defining the innermost ring is 50 mils, and if two objects in the field lie on a common diameter of rings 20 and one corresponds with the innermost ring while the other corresponds with the third ring from the center, it will be readily apparent that the angular distance between them in space with respect to the device will be equal to $50\sqrt{5}-50$ mils. In the same manner the angular speed of an object moving substantially parallel to the face of the sight may be readily computed by its progress across the field from ring to ring, and similarly the distance of any object whose size or approximate size is known may be readily computed by its relation to two or more rings.

In order, therefore, to produce one of the above described sights wherein the innermost ring or any other ring will have a particular angular size, it is only necessary to substitute in the above equation the value for the desired angle of incidence and the proper values of Γ and of $w$ and $e$ for the particular birefringent material to be used and then to solve for the required thickness. It will also be apparent that thickness for a given ring size is dependent on the birefringence of element 10 and decreases as the latter increases. Thus for example, if element 10 is a basal section of calcite substantially .060 inch in thickness, the innermost of rings 20 will have a radius subtending an angle of substantially 50 mils, whereas the same ring size can be obtained by utilizing as element 10 a basal section of sodium nitrate only substantially .035 inch in thickness. For other birefringent materials, the thickness for a given ring size will similarly vary in accordance with the foregoing equation.

Figs. 4, 5 and 6 illustrate interference patterns obtained with embodiments of the invention utilizing linear polarizing elements instead of circular polarizers. If in Fig. 2 polarizers 12 and 14 comprise linear polarizing elements having their polarizing axes substantially perpendicular, the resulting pattern will be as illustrated by sight 30 in Fig. 4, and will comprise a series 32 of concentric segments of rings separated by a substantially Maltese cross 33. The center of said cross coincides with the center of segments 32 and corresponds to dot 28 at the center of the ring pattern illustrated in Fig. 3. In white light cross 33 will be dark and substantially opaque, and segments 32 will appear colored in the sequence of interference colors, whereas in monochromatic light both the cross and the circles will appear substantially black.

Fig. 5 illustrates the converse of Fig. 4, namely the pattern obtained in a sight 35 employing linear polarizers having their polarizing axes relatively parallel. Instead of the dark cross 33 of Fig. 4 the concentric ring segments 36 in Fig. 5 are separated by a clear area 38 corresponding in outline to cross 33. Fig. 6 represents a pattern intermediate the patterns shown in Figs. 4 and 5 and obtainable by employing in sight 40 linear polarizers having their polarizing axes neither parallel nor perpendicular to each other. It will be noted that said pattern comprises concentric segments 42 similar to 32 in Fig. 4 but that cross 44 is provided with a substantially clear center area 45. In other words the effect of this arrangement is that the four arms of the cross seem to point towards the open center 45 of segments 42. The optical density of cross arms 44 depends on the angle between the axes of the polarizing elements employed in sight 40, and it may accordingly be varied between the substantially black color of cross 33 in Fig. 4 and the substantially complete transparency of cross area 38 in Fig. 5.

It should be noted that although in the drawings all of the sights are illustrated as circular, the invention is in no way limited to such shape nor to any particular size. On the contrary, it is contemplated that embodiments of the invention may be made in sizes and shapes sufficient to provide an adequate viewing area for both eyes of an observer simultaneously. The invention is also not limited to embodiments wherein the ring sizes are constant. As already noted, for an element 10 of given birefringence the ring sizes are dependent on the thickness of said element, and in Fig. 7 there is shown means for controlling the effective thickness of the birefringent element to alter correspondingly the spacing of the concentric rings. In the device shown in Fig. 7, the uniaxial birefringent central element has been cut into two wedges, 50 and 52, with the optic axis of each wedge positioned as before in the direction shown by arrow 54. A light-polarizing element 56 of any of the types previously described is illustrated as affixed to the light-transmitting surface of each of the wedge elements. Means (not shown) are provided for moving one of the birefringent wedges, either 50 or 52, and its associated polarizing element 56 with respect to the other wedge, so as to reduce the effective thickness of the combined pair of wedges. For example, wedge 52 and its associated light-polarizing element 56 may be moved from the position shown in solid lines in Fig. 7 to the position shown in dotted lines, and the effect of such displacement will be substantially to reduce the combined thickness of the two wedges. It will be apparent, moreover, that the same result may be achieved without moving either polarizing element 56, but by moving either wedge element alone or by moving both wedges in opposite directions.

It will be understood that under circumstances such as have been described the effective aperture of the sight will be limited to the area between dash lines 60 and 62, but this need prove to be no handicap, as wedge elements 50 and 52 may be made sufficiently large to provide an adequate sight aperture even with one of the elements displaced in the manner illustrated. It is to be understood, furthermore, that although the preferred displacement is one in which the contacting surfaces of wedge elements 50 and 52 remain substantially in surface-to-surface contact, this is not essential, and the displaced birefringent wedge might be moved for example in a direction perpendicular to arrow 54 and to the right, as shown in Fig. 7. Any suitable mounting means may be employed for effecting such displacement. The movable portion of the sight may, for example, be mounted upon a track along which it may be moved manually or in response to the turning of a worm gear, or in any other way. All such modifications are to be deemed to fall within the scope of the invention.

It has already been explained how the interference pattern serving as the reticle of each of the above sighting devices defines a predetermined series of angular directions with respect to said device. In practicing the invention, this series of directions should be translated into terms of the direction of aim of the instrument with which the sight is combined, and this may be conveniently accomplished by suitable mounting means providing an operative relation between said sight and said instrument. The choice of appropriate mounting means will depend upon the particular instrument with which the sight is to be used. Thus for example, said sight may be incorporated in the view finder of a camera with the optic axis of element 10 substantially parallel with the optic axis of the camera lens system, or slightly tilted towards said lens axis to compensate for parallax. The sights of the present invention may be similarly utilized in a fixed mount as the finder for a telescope or any analogous instrument adapted to be aimed in a predetermined direction.

When the novel sights of the invention are utilized in combination with firearms, the mounting involves a somewhat different problem. If the firearm is intended primarily for substantially point-blank range, as for example in the case of machine guns used in airplanes, where the range is usually between 200 and 600 yards and hence is substantially point-blank, a fixed mount may be used analogous to those discussed in connection with cameras and telescopes. With such weapons the sight may be mounted directly on or adjacent the barrel and with the optic axis of the birefringent element in the sight substantially parallel with said barrel. The center of the interference pattern in the sight will then substantially coincide with the point in the field at which the weapon is aimed.

When the sights of the invention are combined with guns used at ranges longer than point-blank and with which trajectory must be taken into account in aiming, the mounting means for the sight should preferably include means for varying the relation between the apparent position of the reticle in the field and the actual direction of aim of the gun to compensate for changes in range and trajectory. An illustrative example of such means is shown somewhat diagrammatically and in fragmentary fashion in Fig. 8, wherein sight 70 represents a sight of the present invention mounted upon a gun barrel 72. Support 74 for sight 70 is indicated as slightly curved forward and adapted to telescope into base 76 so that as the range of the firearm is increased sight 70 is elevated further above barrel 72 and is automatically slightly inclined forward. A suitable scale, in yards or other suitable units, may be provided on element 74, and means such as set screw 78 may be provided for locking the sight in position for the desired range. It should be understood that support 74 is not rotatable within base 76, as is indicated by showing said support as substantially square in cross section. With such mounting means the sight is first adjusted to the desired range, so that when the reticle is then centered on the target, the gun barrel will be tilted upwards with respect to the line of sight sufficiently to compensate for trajectory. Many equivalent mounting means will be readily apparent to those skilled in the art, and it should also be noted that a similar adjustable mount may be used to compensate for parallax at shorter ranges with either a gun or a camera. Similar mounting means may be employed when the sights of the invention are more or less remotely positioned with respect to a gun or similar instrument, as for example in the case of fire control apparatus embodying an aiming position at a distance from the gun or guns controlled thereby.

An important consideration in connection with all mounts and uses of the above sights of the present invention is that the positioning of said sights is primarily determined by the disposition of the optic axis of the birefringent element therein. This results from the fact that since the center of the interference pattern at all times coincides with the point in the field from which a light ray is passing to the eye of the observer along said optic axis, all other angular directions defined by said pattern are in terms of their relation to the center ray. It is for this reason that it is preferred to use a basal section of uniaxial material, since the center ray will then always be normal to the outer surfaces of the sight. If, however, one of the above sights embodies birefringent material wherein the optic axis is obliquely disposed, this may be compensated for by mounting the sight in tilted position such that said axis is directed in the desired direction. Thus for example such a sight may be mounted on a gun barrel and tilted in the plane of said barrel such that the axis of the birefringent element therein is substantially parallel with said barrel. All such modifications are to be construed as coming within the scope of the invention.

It should be expressly understood that the present invention is not limited to the above described reticle forming means, and that on the contrary there may be employed any other means for forming an interference pattern at optical infinity. An illustrative example of such alternative means is shown in Fig. 9. Plates 80 and 82 of glass or other transparent material are positioned closely adjacent each other and with their adjacent faces 84 and 85 as nearly as possible completely parallel and optically smooth. Surfaces 84 and 85 are also partially silvered or otherwise treated in such manner that they reflect a substantial portion of incident light but are otherwise transparent. Any suitable means such, for example, as rim 86, may be provided for retaining plates 80 and 82 in the desired relation. If plates 80 and 82 are sufficiently close together, for example of the order of ten wavelengths of visible light apart, an interference pattern will be caused by multiple reflection between surfaces 84 and 85, and said pattern will comprise a series of concentric rings similar to those shown in Figs. 1 and 3, depending upon the precise distance between surfaces 84 and 85. If said distance is equal to an uneven number of quarter-wavelengths, the center of said pattern will be open as in Fig. 1, but if said distance is equal to an even number of quarter-wavelengths, the center of said pattern will be substantially opaque as in Fig. 3. Furthermore, said pattern will be a function of the angle of incidence of light on the device and it will accordingly be at optical infinity. The center of said pattern will coincide with a normal from the field to the device in substantially the same manner as the center of rings 20 in Fig. 1. It will be seen therefore that the device shown in Fig. 9 may be mounted as a sight in any of the ways described in connection with the sights shown in Figs. 1–6, and will possess similar advantages.

Since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. In combination with an instrument such as a gun, camera or the like having an axis which determines the direction of operation of said instrument, sighting means comprising, in combination, means providing a transparent viewing area having a viewing axis, means for forming an interference pattern at optical infinity visible to an observer looking through said viewing area, said pattern-forming means producing a central interference indicium appearing concentric with said viewing axis at optical infinity and serving as a reticle for said sighting means, said pattern-forming means also producing a predetermined series of other interference indicia appearing at optical infinity and being predeterminedly angularly related to said viewing axis, and means for so mounting said sighting means in operative relation with said instrument that said viewing axis bears a predetermined relationship with said instrument axis, whereby said indicia bear predetermined angular relations with said instrument axis.

2. In combination with an instrument such as a gun, camera or the like having an axis which determines the direction of operation of said instrument, sighting means comprising, in combination, means providing a transparent viewing area having a viewing axis, means for forming an interference pattern at optical infinity visible to an observer looking through said viewing area, said pattern-forming means comprising means for selectively transmitting incident light rays as a function of the angle of incidence thereon of said light rays, the transmission of said pattern-forming means for light of any given angle of incidence being constant over substantially the entire area thereof, said pattern-forming means producing a central interference indicium appearing concentric with said viewing axis at optical infinity and serving as a reticle for said sighting means, said pattern-forming means also producing a predetermined series of other interference indicia appearing at optical infinity and being predeterminedly angularly related to said viewing axis, and means for so mounting said sighting means in operative relation with said instrument that said viewing axis bears a predetermined relationship with said instrument axis, whereby said indicia bear predetermined angular relations with said instrument axis.

3. In combination with an instrument such as a gun, camera or the like having an axis which determines the direction of operation of said instrument, sighting means comprising, in combination, means providing a transparent viewing area having a viewing axis, means for forming an interference pattern at optical infinity visible to an observer looking through said viewing area, said pattern-forming means comprising means for selectively absorbing incident light rays as a function of the angle of incidence thereon of said light rays, the absorption of said pattern-forming means for light of any given angle of incidence being constant over substantially the entire area thereof, said pattern-forming means producing a central interference indicium appearing concentric with said viewing axis at optical infinity and serving as a reticle for said sighting means, said pattern-forming means also producing a predetermined series of other interference indicia appearing at optical infinity and being predeterminedly angularly related to said viewing axis, and means for so mounting said sighting means in operative relation with said instrument that said viewing axis bears a predetermined relationship with said instrument axis, whereby said indicia bear predetermined angular relations with said instrument axis.

4. In combination with an instrument such as a gun, camera or the like having an axis which determines the direction of operation of said instrument, sighting means comprising, in combination, means providing a transparent viewing area having a viewing axis, means comprising a plurality of light polarizing elements positioned in superimposed relation and a birefringent element so positioned between said polarizing elements and of such birefringence as to form an interference pattern at optical infinity visible to an observer looking through said viewing area, said pattern-forming means producing a central interference indicium appearing concentric with said viewing axis at optical infinity and serving as a reticle for said sighting means, said pattern-forming means also producing a predetermined series of other interference indicia appearing at optical infinity and being predeterminedly angularly related to said viewing axis, and means for so mounting said sighting means in operative relation with said instrument that said viewing axis bears a predetermined relationship with said instrument axis, whereby said indicia bear predetermined angular relations with said instrument axis.

5. In combination with an instrument such as a gun, camera or the like having an axis which determines the direction of operation of said instrument, sighting means comprising, in combination, means providing a transparent viewing area, means positioned within the line of sight through said viewing area for forming an interference pattern at optical infinity visible to an observer looking through said viewing area, said pattern-forming means having an optic axis and said pattern-forming means producing a central interference indicium appearing concentric with said optic axis at optical infinity and serving as a reticle for said sighting means, said pattern-forming means also producing a predetermined series of other interference indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

6. In combination with an instrument such as a gun, camera or the like having an axis which determines the direction of operation of said instrument, sighting means comprising, in combination, means providing a transparent viewing area, means positioned within the line of sight through said viewing area for forming an interference pattern at optical infinity visible to an observer looking through said viewing area, said pattern-forming means comprising means for selectively transmitting incident light rays as a function of the angle of incidence thereon of said light rays, the transmission of said pattern-forming means for light of any given angle of incidence being constant over substantially the entire area thereof, said pattern-forming means having an optic axis and said pattern-forming means producing a central interference indicium appearing concentric with said optic axis at optical infinity and serving as a reticle for said sighting means, said pattern-forming means also producing a predetermined series of other interference indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

7. In combination with an instrument such as a gun, camera or the like having an axis which determines the direction of operation of said instrument, sighting means comprising, in combination, means providing a transparent viewing area, means positioned within the line of sight through said viewing area for forming an interference pattern at optical infinity visible to an observer looking through said viewing area, said pattern-forming means comprising means for selectively absorbing incident light rays as a function of the angle of incidence thereon of said light rays, the absorption of said pattern-forming means for light of any given angle of incidence being constant over substantially the entire area thereof, said pattern-forming means having an optic axis and said pattern-forming means producing a central interference indicium appearing concentric with said optic axis at optical infinity and serving as a reticle for said sighting means, said pattern-forming means also producing a predetermined series of other interference indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

8. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

9. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements substantially transmitting light polarized by the other of said polarizing elements, and a birefringent element so positioned between said polarizing elements and of such birefrigence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

10. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements substantially absorbing light polarized by the other of said polarizing elements, and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

11. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, said polarizing elements linearly polarizing transmitted light and being positioned with their respective polarizing axes substantially parallel, and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

12. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, said polarizing elements linearly polarizing transmitted light and being positioned with their respective polarizing axes substantially perpendicular, and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

13. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, said polarizing elements linearly polarizing transmitted light and being positioned with their respective polarizing axes neither parallel nor perpendicular, and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

14. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements circularly polarizing light transmitted thereby in the direction of the other of said polarizing elements and each substantially transmitting light polarized by the other thereof, and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

15. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements circularly polarizing light transmitted thereby in the direction of the other of said polarizing elements and each substantially absorbing light polarized by the other thereof, and a birefringent element so positioned between said polarizing elements and of such birefringence as to form an interference pattern at optical infinity visible to an observer looking through said viewing area, said pattern-forming means having an optic axis and said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined rela- 16. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area and a uniaxial birefringent element positioned between said polarizing elements with its optic axis so disposed that light incident on said sighting means can traverse said birefringent element along said axis, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

17. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area and a uniaxial birefringent element positioned between said polarizing elements with its optic axis substantially perpendicular to said polarizing elements, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

18. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area and a birefringent element positioned between said polarizing elements, said birefringent element comprising a substantially basal section of uniaxial material and being positioned with its optic axis substantially perpendicular to said polarizing elements, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

19. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area and a birefringent element positioned between said polarizing elements, said birefringent element comprising a substantially basal section of calcite positioned with its optic axis substantially perpendicular to said polarizing elements, said birefringent element being of such thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

20. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area and a birefingent element positioned between said polarizing elements, said birefringent element comprising a substantially basal section of sodium nitrate positioned with its optic axis substantially perpendicular to said polarizing elements, said birefringent element being of such thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

21. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements circularly polarizing light transmitted thereby in the direction of the other of said polarizing elements and each substantially transmitting light polarized by the other thereof, and a birefringent element positioned between said polarizing elements, said birefringent element comprising a substantially basal section of uniaxial material and being positioned with its optic axis substantially perpendicular to said polarizing elements, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

22. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements circularly polarizing light transmitted thereby in the direction of the other of said polarizing elements and each substantially absorbing light polarized by the other thereof, and a birefringent element positioned between said polarizing elements, said birefringent element comprising a substantially basal section of uniaxial material and being positioned with its optic axis substantially perpendicular to said polarizing elements, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

23. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements circularly polarizing light transmitted thereby in the direction of the other of said polarizing elements, and a birefringent element positioned between said polarizing elements, said birefringent element comprising a substantially basal section of calcite positioned with its optic axis substantially perpendicular to said polarizing elements, said birefringent element being of such thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

24. In combination with an instrument such as a gun, camera or the like having an axis which determines the direction of operation of said instrument, sighting means comprising, in combination, means providing a transparent viewing area, means comprising a plurality of light polarizing elements positioned in superimposed relation and within the line of sight through said viewing area, each of said polarizing elements circularly polarizing light transmitted thereby in the direction of the other of said polarizing elements, and a birefringent element positioned between said polarizing elements, said birefringent element comprising a substantially basal section of sodium nitrate positioned with its optic axis substantially perpendicular to said polarizing elements, said birefringent element being of such thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis bears a predetermined relationship with said instrument axis whereby said indicia bear predetermined angular relations with said instrument axis.

25. In combination with an instrument such as a gun, camera or the like having an axis which determines the direction of operation of said instrument, sighting means comprising, in combination, means providing a transparent viewing area, means for forming an interference pattern at optical infinity visible to an observer looking through said viewing area, said pattern-forming means having an optic axis and said pattern-forming means producing a central interference indicium appearing concentric with said optic axis at optical infinity and serving as a reticle for said sighting means, said patterforming means also producing a predetermined series of other interference indicia appearing at optical infinity and being predeterminedly angularly related to said optic axis, and means for so mounting said sighting means in operative relation with said instrument that said optic axis bears a predetermined relationship with said instrument axis, said mounting means comprising means for shifting said optic axis with respect to said instrument axis.

26. In combination with an instrument such as a gun, camera or the like adapted to be aimed in a predetermined direction, sighting means comprising, in combination, means providing a transparent viewing area, means comprising a plurality of light polarizing elements positioned in superimposed relation and within the line of sight through said viewing area and a uniaxial birefringent element positioned between said polarizing elements with its optic axis so disposed that light incident on said sighting means can traverse said birefringent element along said axis, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis of said birefringent element bears a predetermined relation to the direction of aim of said instrument.

27. In combination with an instrument such as a gun, camera or the like adapted to be aimed in a predetermined direction, sighting means comprising, in combination, means providing a transparent viewing area, means comprising a plurality of light polarizing elements positioned in superimposed relation and within the line of sight through said viewing area and a uniaxial birefringent element positioned between said polarizing elements with its optic axis so disposed that light incident on said sighting means can traverse said birefringent element along said axis, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis of said birefringent element substantially coincides with the direction of aim of said instrument.

28. In combination with an instrument such as a gun, camera or the like adapted to be aimed in a predetermined direction, sighting means comprising, in combination, means providing a transparent viewing area, means comprising a plurality of light polarizing elements positioned in superimposed relation and within the line of sight through said viewing area and a uniaxial birefringent element positioned between said polarizing elements with its optic axis so disposed that light incident on said sighting means can traverse said birefringent element along said axis, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis of said birefringent element bears a predetermined relation to the direction of aim of said instrument, said mounting means comprising means for predeterminedly varying the relation between said optic axis and said direction of aim of said instrument.

29. In combination with an instrument such as a gun, camera or the like adapted to be aimed in a predetermined direction, sighting means comprising, in combination, means providing a transparent viewing area, means comprising a plurality of light polarizing elements positioned in superimposed relation and within the line of sight through said viewing area and a birefringent element positioned between said polarizing elements, said birefringent element comprising a substantially basal section of uniaxial material and being positioned with its optic axis substantially perpendicular to said polarizing elements, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis of said birefringent element bears a predetermined relation to the direction of aim of said instrument.

30. In combination with an instrument such as a gun, camera or the like adapted to be aimed in a predetermined direction, sighting means comprising, in combination, means providing a transparent viewing area, means comprising a plurality of light polarizing elements positioned in superimposed relation and within the line of sight through said viewing area, and a birefringent element positioned between said polarizing elements, said birefringent element comprising a substantially basal section of uniaxial material and being positioned with its optic axis substantially perpendicular to said polarizing elements, said birefringent element being of such birefringence and thickness as to form with said polarizing elements an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for so mounting said sighting means in operative relation with said instrument that said optic axis of said birefringent element bears a predetermined relation to the direction of aim of said instrument, said mounting means comprising means for predeterminedly varying the relation between said optic axis and said direction of aim of said instrument.

EDWIN H. LAND.

REFERENCES CITED

The following references are of record in the file of this patent:

UNITED STATES PATENTS

| Number | Name | Date |
|---|---|---|
| 1,610,532 | Russell et al. | Dec. 14, 1926 |
| 2,313,204 | Morelle | Mar. 9, 1943 |
| 2,160,202 | Fieux | May 30, 1939 |
| 2,105,671 | Roesch | Jan. 18, 1938 |
| 2,018,214 | Land | Oct. 22, 1935 |
| 2,099,694 | Land | Nov. 23, 1937 |
| 942,393 | Konig | Dec. 7, 1909 |
| 1,926,716 | Ehringhaus | Sept. 12, 1933 |

FOREIGN PATENTS

| Number | Country | Date |
|---|---|---|
| 15,708 | British | Nov. 6, 1915 |
| 378,742 | British | Aug. 13, 1932 |

OTHER REFERENCES

Johannsen Test Manual of Petrographic Methods, McGraw Hill Book Co., New York, 1918, 2nd ed., pp. 416–418 and Plates facing pages 416–418 (pages 445–447 not used in the rejection of the claims are of interest in that they contain a discussion of dispersion in crystals).

Wright Text on Light, publ. 1892, McMillan & Co., New York, pages 339, 340, 361, 364, 365, plate 6 opposite page 336 and plate 8 opposite page 360.